United States Patent [19]

Fujiki et al.

[11] Patent Number: 5,366,806
[45] Date of Patent: Nov. 22, 1994

[54] INTEGRATED THERMOPLASTIC RESIN/SILICONE RUBBER ARTICLES AND METHOD FOR MAKING

[75] Inventors: Hironao Fujiki, Takasaki; Shigeki Shudo, Annaka, both of Japan

[73] Assignee: Shin-Etsu Chemical Co., Ltd., Tokyo, Japan

[21] Appl. No.: 965,303

[22] Filed: Oct. 23, 1992

[30] Foreign Application Priority Data

Oct. 23, 1991 [JP] Japan ................... 3-304173

[51] Int. Cl.⁵ .................. B29C 43/20; B29K 19/00
[52] U.S. Cl. ...................... 428/412; 428/421; 428/425.5; 428/447; 428/451
[58] Field of Search ............. 428/447, 421, 412, 451, 428/425.5

[56] References Cited

U.S. PATENT DOCUMENTS

| | | | |
|---|---|---|---|
| 4,686,124 | 8/1987 | Onohara et al. | 428/35 |
| 4,780,260 | 10/1988 | Yoshida et al. | 264/255 |

FOREIGN PATENT DOCUMENTS

| | | |
|---|---|---|
| 0143994 | 6/1985 | European Pat. Off. |
| 0178896 | 4/1986 | European Pat. Off. |
| 0249336 | 12/1987 | European Pat. Off. |
| 0276790 | 8/1988 | European Pat. Off. |
| 0314847 | 5/1989 | European Pat. Off. |

OTHER PUBLICATIONS

Database WPI, Week 7736, Derwent Publications Ltd., London, GB.
Patent Abstracts of Japan, vol. 8, No. 156 (C-234) (Jul. 19, 1984).
Patent Abstracts of Japan, vol. 12, No. 209 (C-504) (Jun. 15, 1988).

*Primary Examiner*—Ralph H. Dean
*Attorney, Agent, or Firm*—Millen, White, Zelano, & Branigan

[57] ABSTRACT

An integrated thermoplastic resin/silicone rubber article is prepared by modifying a thermoplastic resin with a silicon-containing compound in monomer or polymer form, molding the thermoplastic resin into a shape, contacting an uncured silicone rubber with the molded thermoplastic resin, and curing the silicone rubber at a temperature below the softening point of the thermoplastic resin. The article in which the thermoplastic resin is firmly united with the silicone rubber is useful in electric, electronic and automotive applications while taking advantage of the inherent reliability in heat resistance, weather resistance and electrical properties of the silicone rubber.

18 Claims, No Drawings

INTEGRATED THERMOPLASTIC RESIN/SILICONE RUBBER ARTICLES AND METHOD FOR MAKING

TECHNICAL FIELD

This invention relates to integrated thermoplastic resin/silicone rubber articles and more particularly, integrated articles comprising a molding of a thermoplastic resin such as polyethylene, polypropylene and nylon resins and a silicone rubber layer integrally joined thereto as well as a method for preparing the same.

BACKGROUND OF THE INVENTION

It was quite difficult in the prior art to firmly join silicone rubber to polyolefin resins such as polyethylene, polypropylene and fluorine resins. Silicone rubber could be attached to nylon resins and polycarbonate resins by applying a primer prior to the silicone rubber or by moderately heat curing an uncured silicone rubber over a relatively long time, but the bonding force was low.

Silicone rubbers found wide-spread use in electric, automobile and other applications since they were recognized to be reliable with respect to heat resistance, weather resistance and electrical properties. However, therefor was a need for a method capable of firmly joining silicone rubber to thermoplastic resin to form an integrated article.

Several proposals were made to meet such a need. Japanese Patent Application Kokai (JP-A) No. 178048/1985 discloses to add an organohydrogenpolysiloxane containing more than 30 mol % of an organohydrogensiloxane unit to an olefin resin in order to bond silicone rubber to the olefin resin. Since this organohydrogenpolysiloxane has a relatively long polysiloxane chain and is less compatible with a thermoplastic resin, it can give rise to undesired phenomena like separation and largely affect the mechanical properties of molded thermoplastic resin, especially resulting in a loss of modulus. Also JP-A 183843/1988 discloses that silicone rubber can be bonded to an olefin resin by adding to the olefin resin a silicon compound containing an organic group having at least one aliphatic unsaturated bond and at least one hydrolyzable group attached to a silicon atom in a molecule. This silicon compound is free of the above-mentioned drawbacks of JP-A 178048/1985, but is less reactive with silicone rubbers, especially addition type silicone rubbers so that no satisfactory adhesion is obtained unless a primer is used. There is commercially available a silane-crosslinked polyethylene which falls within this concept. Our attempt to cure addition type silicone rubber directly to the silane-crosslinked polyethylene failed to achieve a satisfactory bond.

SUMMARY OF THE INVENTION

Therefore, an object of the present invention is to overcome the above-mentioned drawbacks of the prior art and to provide an integrated article in which a thermoplastic resin and a silicone rubber are firmly joined so that both components may exert their own effects. Another object is to provide a method for preparing the integrated article.

We have found that when a thermoplastic resin is modified with a silicon-containing compound having at least one hydrogen atom directly attached to a silicon atom and an aliphatic unsaturated group in a molecule and/or a polymer thereof by mixing and heating them, the thermoplastic resin is then molded into a shape, and an uncured silicone rubber is contacted with the molded thermoplastic resin and then cured to the thermoplastic resin at a temperature below the softening point of the thermoplastic resin; the silicone rubber can be firmly joined to the thermoplastic resin, such as polyethylene, polypropylene and polyamide resins. This method eliminates the drawbacks of the above-referred organohydrogenpolysiloxane containing more than 30 mol % of an organohydrogensiloxane unit and offers an integrated article in which silicone rubber is integrally joined to thermoplastic resin.

In a first form, the present invention is directed to an integrated thermoplastic resin/silicone rubber article in which a silicone rubber layer is integrally joined to a molded shape of a thermoplastic resin. The thermoplastic resin has been modified with a silicon-containing compound having at least one hydrogen atom directly attached to a silicon atom and an aliphatic unsaturated group in a molecule and/or a polymer thereof.

A second form of the present invention is directed to a method in which an integrated thermoplastic resin/silicone rubber article is prepared by modifying a thermoplastic resin with a silicon-containing compound as defined above and/or a polymer thereof by mixing and heating them; molding the thermoplastic resin into a shape; contacting an uncured silicone rubber with the molded thermoplastic resin; and curing the silicone rubber to the thermoplastic resin at a temperature below the softening point of the thermoplastic resin.

DETAILED DESCRIPTION OF THE INVENTION

The integrated article of the present invention is comprised of a silicone rubber layer integrally jointed to a molded shape of a thermoplastic resin. The thermoplastic resin has been modified with a silicon-containing compound having at least one hydrogen atom directly attached to a silicon atom and an aliphatic unsaturated group in a molecule, a polymer thereof or a mixture thereof.

The thermoplastic resins to which the invention is applicable include, for example, polyethylene, polypropylene, fluorocarbon, polyamide, and polycarbonate resins although the invention is not limited to these resins.

The silicon-containing compound with which the thermoplastic resin is modified is not particularly limited as long as it has at least one hydrogen atom directly attached to a silicon atom in a molecule and an aliphatic unsaturated group in a molecule. Preferably a choice may be made of those silicon-containing compounds which are well compatible with the thermoplastic resins.

When expressed by a structural unit formula, the hydrogen atom directly attached to a silicon atom is preferably represented by $—SiR_2H$ or $—SiRH_2$ wherein R is a group commonly used as a substituent on the silicon atom. Typically R is a monovalent substituted or unsubstituted hydrocarbon group having 1 to 10 carbon atoms, preferably 1 to 8 carbon atoms, for example, alkyl groups such as methyl, ethyl, propyl, butyl, hexyl and cyclohexyl groups; aryl groups such as phenyl, tolyl, and naphthyl groups; aralkyl groups such as benzyl and phenylethyl groups; and halosubstituted alkyl groups such as chloromethyl and trifluoropropyl groups.

Where the silicon-containing compound is a monomer or has a relatively low molecular weight, it should contain an aliphatic unsaturated group in a molecule. The aliphatic unsaturated groups include alkenyl groups such as vinyl, allyl, propenyl, and butenyl groups; and acryloxypropyl, methacryloxypropyl, cyclohexenyl, cyclopentadienyl, ethynyl, and cinnamylpropyl groups, etc. These aliphatic unsaturated groups are organic groups capable of radical reaction with free radicals created in the thermoplastic resin. If the silicon-containing compound does not contain an aliphatic unsaturated group, the hydrogen atom attached to a silicon atom plays the role of an organic group capable of radical reaction with free radicals created in the thermoplastic resin.

The silicon-containing compound may be either a monomer or a polymer. Examples of the monomeric silicon-containing compound are given below.

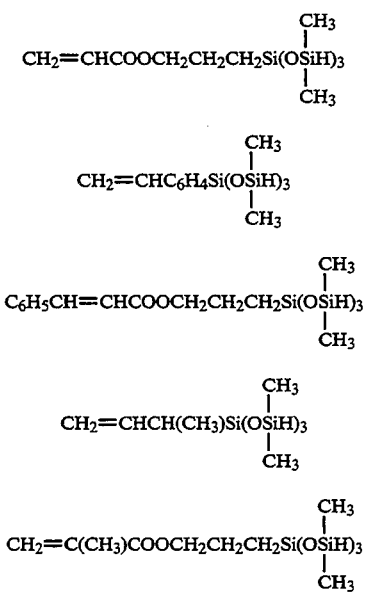

Also useful are polymers of these silicon-containing compounds and binary or more copolymers of these silicon-containing compounds with other polymerizable monomers such as alkyl acrylates, styrene, maleic anhydride, vinyl ether, vinyl acetate, and vinyl silane. For brevity's sake, both the monomers and polymers are simply referred to as "silicon-containing compounds", hereinafter.

Preferably the silicon-containing compound is blended in amounts of about 0.1 to about 50 parts, more preferably about 0.5 to about 10 parts by weight per 100 parts by weight of the thermoplastic resin. Less than 0.1 part by weight of the compound would be too small to modify the thermoplastic resin so as to firmly bond with silicone rubber whereas more than 50 parts by weight of the compound would adversely affect the physical properties of the thermoplastic resin.

The thermoplastic resin is modified with a silicon-containing compound, preferably by heating and mixing the components. This hot mixing may be carried out by mixing and dispersing the silicon-containing compound in the thermoplastic resin at a temperature above the softening point of the thermoplastic resin. The mixing apparatus is not particularly limited insofar as both the components are uniformly mixed. For example, kneaders, Banbury mixers screw extrudes or the like may be used. In particular, a thermoplastic resin and a silicon-containing compound may be mixed by charging the mixer with the resin in particulate form and the compound in solid form at the same time and mixing the components while heating, or by previously heating the resin in the mixer to a molten state, then adding the compound to the mixer, and mixing the components. An alternative is screw-assisted melt mixing as found in injection molding and extrusion molding.

During this hot mixing, it is recommended to use a free radical-releasing compound in combination when the silicon-containing compound used is a monomer containing an aliphatic unsaturated bond. A variety of free radical-releasing compounds are known although preferred examples include organic peroxides such as benzoyl peroxide, dichlorobenzoyl peroxide, dicumyl peroxide, di-t-butyl peroxide, t-butyl peracetate, 2,5-dimethyl-2,5-di-t-butyl peroxyhexane, 2,5-dimethyl-2,5-di-t-butyl peroxyhexine, and t-butyl perbenzoate; azo compounds such as azobisisobutyronitrile and dimethylazodiisobutylate; —Si—Si—compounds such as disilane and polysilane; and transition metal compounds such as cerium oxide and cerium hydroxide, with the organic peroxides being preferred for availability and ease of handling. Where such a free radical-releasing compound is used, it is sometimes advantageous to heat the system to a sufficient temperature for free radicals to release. More particularly, a temperature above the softening point of the thermoplastic resin is chosen for efficient mixing and a temperature between 100° C. and 200° C. is chosen for efficient release of free radicals. Thus treatment at a temperature between 100° C. and 200° C. and above the softening point of the thermoplastic resin is recommended. The free radical-releasing compound is preferably blended in amounts of about 0.01 to about 2 parts, more preferably about 0.05 to about 0.5 parts by weight per 100 parts by weight of the thermoplastic resin.

It is to be understood that where the silicon-containing compound used is a polymer, it is unnecessary to heat and mix the polymer and the thermoplastic resin in the presence of a free radical-releasing compound. Simple mixing above the softening point of the thermoplastic resin is sufficient.

According to the present invention, the thermoplastic resin modified with the silicon-containing compound is then molded into a predetermined shape. The shape of molding is not particularly limited and the molding may take a film, sheet, fiber, plate, rod, bar or another shape. The molding technique may be selected from conventional thermoplastic resin molding techniques depending on a particular shape of molding. One exemplary known technique is to pelletize the modified thermoplastic resin, heating the resin at or above its softening point, injecting the resin into a mold cavity, and cooling the resin below its softening point. Any desired molding machine such as injection molding and transfer molding machines may be used.

The integrated thermoplastic resin/silicone rubber article of the invention is obtained by integrating a molded shape of the modified thermoplastic resin with silicone rubber. Integration is accomplished by contacting an uncured silicone rubber with the molded thermoplastic resin, and curing the silicone rubber to the thermoplastic resin at a temperature below the softening point of the thermoplastic resin. The molding of thermoplastic resin may be either entirely or partially covered with the silicone rubber and the exact coverage depends on the particular application of the molding. Therefore, as the case may be, the molding may be entirely covered with the silicone rubber, the silicone rubber may be laid up on the molding in sheet form, or the silicone rubber may be molded or applied to a selected portion of the molding. More particularly, integration may be accomplished, for example, by applying an uncured silicone rubber to the thermoplastic resin molding as by coating or dipping and heating the coated molding to a temperature below the softening point of the thermoplastic resin for curing the silicone rubber. Another procedure involves laying up an uncured silicone rubber on the thermoplastic resin molding, heating and compressing the molding at a temperature below the softening point of the thermoplastic resin for curing the silicone rubber. An alternative procedure involves primary injection of the thermoplastic resin into a mold cavity by means of an injection molding machine to form a shape of the thermoplastic resin and secondary injection of an uncured silicone rubber into the cavity and around the shape.

The silicone rubber used herein is preferably an addition reaction type silicone rubber composition. It may be in liquid, putty or paste form in uncured state, with the liquid, putty or paste form generally designated as liquid silicone rubber being preferred for ease of molding.

One especially preferred example of the addition reaction type is a silicone rubber composition comprising (A) 100 parts by weight of a diorganopolysiloxane containing at least two alkenyl groups in a molecule and having a viscosity of 1,000 to 100,000 centipoise (cp) at 25° C., (B) an organohydrogenpolysiloxane having at least two hydrogen atoms attached to silicon atoms in a molecule in such an amount that the molar ratio (a/b) of the alkenyl group (a mol) in component (A) to the silicon-attached hydrogen atom (b mol) in component (B) may range from 0.4 to 4, (C) 5 to 50 parts by weight of finely divided silica having a specific surface area of at least 50 m²/g, and (D) a catalytic amount of a platinum compound or platinum series compound.

This composition will be described in further detail. Component (A) is an organopolysiloxane containing an alkenyl group in a molecule and having a viscosity of 1,000 to 100,000 cp at 25° C. Preferably it is represented by the following general formula (1):

$$R_a^1 SiO_{(4-a)/2} \quad (1)$$

wherein $R^1$, which may be identical or different, is independently a monovalent substituted or unsubstituted hydrocarbon group having 1 to 10 carbon atoms, preferably 1 to 8 carbon atoms. Examples of the $R^1$ group include alkyl groups such as methyl, ethyl, propyl, butyl, hexyl and cyclohexyl groups; aryl groups such as phenyl, tolyl, xylyl and naphthyl groups; aralkyl groups such as benzyl and phenylethyl groups; and halo-substituted hydrocarbon groups such as chloromethyl and 3,3,3-trifluoropropyl groups. There should be present at least two alkenyl groups in a molecule on average. Among the substituents on the silicon atom, a vinyl group is typical of the alkenyl group, a methyl group is typical of the other substituent, and a trifluoropropyl group is desired where solvent resistance is required. Letter a is a number of from 1.9 to 2.4. This organopolysiloxane may be a linear one or branched one containing $R^1SiO_{3/2}$ and $SiO_{4/2}$ units. It is preferred that the vinyl group be present at each end of the molecular chain.

Component (B) is an organohydrogenpolysiloxane which serves as a crosslinking agent by reacting with the alkenyl group-containing organopolysiloxane (A). Its molecular structure is not particularly limited and conventionally available ones including linear, cyclic and branched structures may be used. It should contain at least two hydrogen atoms attached to silicon atoms in a molecule. The substituent attached to a silicon atom other than the hydrogen atoms may be the same as mentioned for $R^1$ in component (A). Component (B) is preferably added in such an amount that the number of hydrogen atoms directly attached to silicon atoms in component (B) may range from 0.4 to 4 equivalents, especially from 0.8 to 2 equivalents per alkenyl group in the organopolysiloxane or component (A). With less than 0.4 equivalents of hydrogen atom, the crosslinking density would be too low and the cured silicone rubber would become less resistant against heat. Above 4 equivalents, foaming can occur through dehydrogenation reaction and heat resistance would be adversely affected. This organohydrogenpolysiloxane may be prepared by a conventional well-known procedure, for example, simply by equilibrating octamethylcyclotetrasiloxane and/or tetramethylcyclotetrasiloxane and a compound containing a $(CH_3)_3SiO_{\frac{1}{2}}$ unit or $H(CH_3)_2SiO_{\frac{1}{2}}$ unit forming a terminal group in the presence of a catalyst such as sulfuric acid, trifluoromethanesulfonic acid and methane-sulfonic acid at a temperature of $-10°$ C. to $+40°$ C.

Component (C) is finely divided silica which is effective for imparting strength to an elastomer resulting from curing of the addition type silicone rubber composition. Since the silica is a reinforcing filler to the silicone rubber, it should have a specific surface area of at least 50 m²/g. Examples of the finely divided silica include hydrophilic silica species, for example, such as Aerosil 130, 200 and 300 (Nippon Aerosil K.K. and De-Gussa), Carbosil MS-5 and MS-7 (Cabot Corp.), Rheolosil QS-102 and 103 (Tokuyama-Soda K.K.), and Nipsil LP (Nippon Silica K.K.); and hydrophobic silica species, for example, such as Aerosil R-812, R-812S, R-972 and R-974 (De-Gussa), Rheolosil MT-10 (Tokuyama-Soda K.K.), and Nipsil SS series (Nippon Silica K.K.). The silica is preferably blended in amounts of 5 to 50 parts, especially 10 to 40 parts by weight per 100 parts by weight of component (A) or organopolysiloxane.

Component (D) is a platinum series catalyst for promoting addition reaction or hydrosilylation between components (A) and (B). The platinum catalyst may be selected from well-known ones, for example, platinum black, chloroplatinic acid, alcohol-modified chloroplatinic acid, and complexes of chloroplatinic acid with olefins, aldehydes, vinyl-siloxanes or acetylene alcohol. The catalyst is added in a catalytic amount which may vary in accordance with the desired curing rate although it generally ranges from about 0.1 to about 1000 parts, preferably from about 1 to about 200 parts by weight of Pt per million parts by weight of component (A).

In order to further increase the bonding force between the addition type silicone rubber composition and the thermoplastic resin, an adhesion modifier is preferably added to the addition type silicone rubber composition. A typical adhesion modifier is a compound containing a hydrogen atom or aliphatic unsaturated group directly attached to a silicon atom and at least one group selected from the group consisting of an alkoxysilyl, oxirane and acid anhydride group. Examples of this compound are given below.

the silicone rubber can adhere to a mold if used. It is then recommended to coat the mold with a release agent such as Teflon resin so that the silicone rubber may not adhere to the mold.

As means for increasing the mechanical strength of

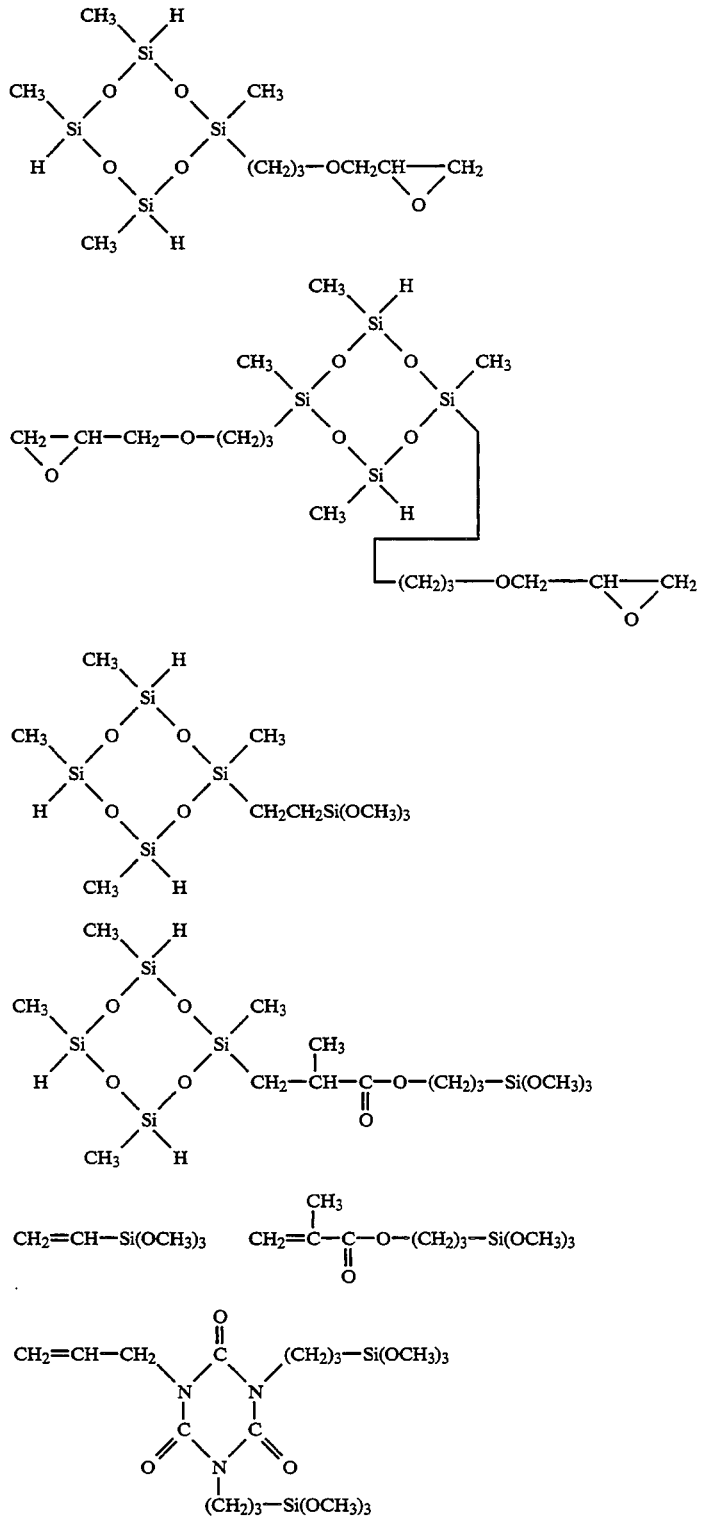

The adhesion modifier is added in amounts of 0 to 20 parts, preferably 0.5 to 10 parts by weight per 100 parts by weight of component (A) or organopolysiloxane. It is to be noted that where an adhesive modifier is added, the silicone rubber composition without increasing the viscosity thereof, a silicone oil-soluble silicone resin comprised essentially of $SiO_2$ and $R_3^1SiO_{\frac{1}{2}}$ units wherein $R^1$ is as defined above and containing at least one alkenyl group in a molecule may be used instead of or in addition to component (C) or finely divided silica.

In addition to the above-mentioned components, the silicone rubber composition may further contain non-reinforcing fillers such as ground quartz, diatomaceous earth, and calcium carbonate, inorganic pigments such as cobalt blue, coloring agents such as organic dyes, and heat resistance/flame retardancy modifiers such as cerium oxide, zinc carbonate, manganese carbonate, red iron oxide, titanium oxide, and carbon black.

EXAMPLE

Examples of the present invention are given below by way of illustration and not by way of limitation. All parts are by weight.

EXAMPLE 1

A Labo-Plasto mill (manufactured by Toyo Seiki K.K.) was charged with 100 parts of a polyethylene resin (low density polyethylene F101-3 manufactured by Sumitomo Chemical K.K.) and 5 parts of a silicon-containing compound of the following formula:

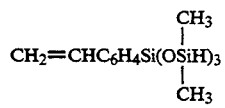

They were mixed for 15 minutes at 180° C. in a nitrogen atmosphere.

The modified resin was admitted into a compression mold coated with Teflon resin and compressed into a sheet of 2 mm thick. An addition curing type silicone rubber composition (KE 1940-40A/B manufactured by Shin-Etsu Chemical Industry Co., Ltd.) was admitted into the mold cavity having the sheet received therein, heat cured at 80° C. for 5 minutes, and cooled down to room temperature. An integrally molded sheet was removed from the mold. It had a dimension of 2.5 mm×10 mm×4 mm thick and consisted of a silicone rubber layer of 2 mm thick and a polyethylene resin layer of 2 mm.

In the molded sheet, the silicone rubber layer and the polyethylene resin layer were integrally bonded. A 180°-peeling bond strength test on this sheet revealed a strong bond at the interface.

EXAMPLE 2

Example 1 was repeated except that a polypropylene resin (100% propylene polymer W101 manufactured by Sumitomo Chemical K.K.) was used instead of the polyethylene resin, and the resin and the silicon-containing compound were mixed for 15 minutes at 200° C. in a nitrogen atmosphere. A sheet consisting of a silicone rubber layer and a polypropylene resin layer was integrally molded. A 180°-peeling bond strength test on this sheet revealed a strong bond at the interface.

EXAMPLE 3

A Banbury mixer was charged with 100 parts of a polyamide resin (nylon-11 Benso P40TL manufactured by Toray K.K.) and 5 parts of a silicon-containing compound polymer defined below. They were mixed for 15 minutes at 210° C. in a nitrogen atmosphere. The silicon-containing compound polymer was obtained by radical polymerization between

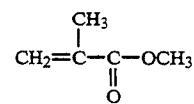

and

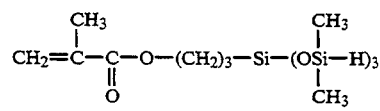

in a molar ratio of 9:1 in the presence of an azobisisobutyronitrile (AIBN) catalyst. The polymer is represented by the following formula:

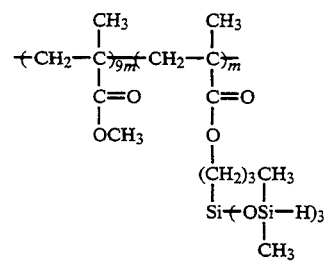

(Letter m is a positive integer.)

As in Example 1, the modified resin was admitted into a compression mold coated with Teflon resin and compression molded into a sheet of 2 mm thick. An addition curing type silicone rubber composition was admitted into the mold cavity having the sheet received therein, heat cured at 80° C. for 5 minutes, and cooled down to room temperature. An integrally molded sheet was removed from the mold.

In the molded sheet, the silicone rubber layer and the polyethylene resin layer were integrally bonded. A 180°-peeling bond strength test on this sheet revealed a strong bond at the interface.

There have been described integrated articles comprised of thermoplastic resins such as polyethylene, polypropylene and polyamide resins having silicon rubber firmly bonded thereto. The articles can be used in a variety of applications covering electric, electronic and automotive fields while taking advantage of the inherent reliability in heat resistance, weather resistance and electrical properties of the silicone rubber. The method of the invention ensures that a firmly united thermoplastic resin/silicone rubber article is manufactured in a simple manner.

We claim:

1. An integrated thermoplastic resin/silicone rubber article comprising
    a molded shape of a thermoplastic resin modified with a silicon-containing compound being compatible with the resin and having at least one hydrogen atom directly attached to a silicon atom, as an —$SiR_2H$ or —$SiRH_2$ group, and an aliphatic unsaturated group in a monomeric or polymeric molecule, where R is a monovalent hydrocarbon group having 1 to 10 carbon atoms, optionally substituted by halogen atoms, and
    a silicone rubber layer integrally joined to the molded shape.

2. The article of claim 1 wherein the thermoplastic resin is selected from the group consisting of polyethylene, polypropylene, fluorocarbon, polyamide, and polycarbonate resins.

3. The article of claim 1 wherein the silicone rubber is a cured product of an addition reaction silicone rubber composition.

4. The article of claim 3 wherein the addition reaction silicone rubber composition comprises (A) 100 parts by weight of a diorganopolysiloxane containing at least two alkenyl groups in a molecule and having a viscosity of 1,000 to 100,000 centipoise at 25° C., (B) an organohydrogenpolysiloxane having at least two hydrogen atoms attached to silicon atoms in a molecule in such an amount that the molar ratio (a/b) of the alkenyl group (a mol) in component (A) to the silicon-attached hydrogen atom (b mol) in component (B) ranges from 0.4 to 4, (C) 5 to 50 parts by weight of finely divided silica having a specific surface area of at least 50 m²/g, and (D) a catalytic amount of a platinum compound or platinum series compound.

5. The article of claim 1, wherein R is an alkyl group having 1 to 8 carbon atoms, a cyclohexyl group, phenyl group, tolyl group, naphthyl group, benzyl group, phenylethyl group, chloromethyl group or trifluoropropyl group.

6. The article of claim 1, wherein the silicon-containing compound is a monomeric compound of one of the following formulae:

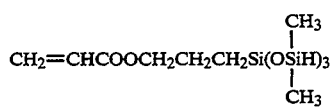

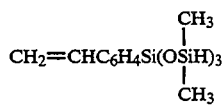

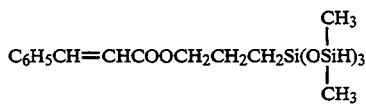

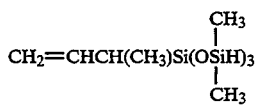

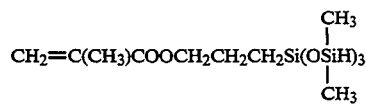

7. An integrated thermoplastic resin/silicone rubber article comprising
a molded shape of a thermoplastic resin modified with a silicon-containing compound having at least one hydrogen atom directly attached to a silicon atom, as an —SiR₂H or —SiRH₂ group, and an aliphatic unsaturated group in a monomeric or polymeric molecule, where R is a monovalent hydrocarbon group having 1 to 10 carbon atoms, optionally substituted by halogen atoms, and
a silicone rubber layer integrally joined to the molded shape,
wherein the silicon-containing compound is a monomeric compound of one of the following formulae:

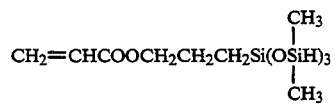

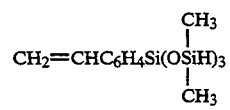

a polymer of these compounds, a copolymer of two or more of these compounds or a copolymer of one of more of these compounds with other polymerizable monomers selected from the group consisting of alkyl acrylates, styrene, maleic anhydride, vinyl ether, vinyl acetate and vinyl silane.

8. A method for preparing an integrated thermoplastic resin/silicone rubber article comprising the steps of:
modifying a thermoplastic resin with a silicon-containing compound being compatible with the resin and having at least one hydrogen atom directly attached to a silicon atom, as an SiR₂H or —SiRH₂ group, and an aliphatic unsaturated group in a monomeric or polymeric molecule, where R is a monovalent hydrocarbon group having 1 to 10 carbon atoms, optionally substituted by halogen atoms, by mixing and heating them,
molding the thermoplastic resin into a shape,
contacting an uncured silicone rubber with the molded thermoplastic resin, and
curing the silicone rubber to the thermoplastic resin at a temperature below the softening point of the thermoplastic resin.

9. The method of claim 8 wherein the thermoplastic resin is selected from the group consisting of polyethylene, polypropylene, fluorocarbon, polyamide, and polycarbonate resins.

10. The method of claim 8 wherein the silicone rubber is a cured product of an addition reaction silicone rubber composition.

11. The method of claim 10 wherein the addition reaction silicone rubber composition comprises (A) 100 parts by weight of a diorganopolysiloxane containing at least two alkenyl groups in a molecule and having a viscosity of 1,000 to 100,000 centipoise at 25° C. (B) an organohydrogenpolysiloxane having at least two hydrogen atoms attached to silicon atoms in a molecule in such an amount that the molar ratio (a/b) of the alkenyl group (a mol) in component (A) to the silicon-attached hydrogen atom (b mol) in component (B) ranges from 0.4 to 4, (C) 5 to 50 parts by weight of finely divided silica having a specific surface area of at least 50 m²/g, and (D) a catalytic amount of a platinum compound or platinum series compound.

12. The method of claim 8, wherein the mixing and heating of the thermoplastic resin and silicon-containing compound is conducted in the presence of a free radical-releasing compound.

13. The method of claim 12, wherein the free radical-releasing compound is an organic peroxide compound.

14. The method of claim 12, wherein the mixture is heated to a sufficient temperature to allow the free radicals to be released, resulting in a reaction between the silicon-containing compound and the thermoplastic resin.

15. The method of claim 8, wherein R is an alkyl group having 1 to 8 carbon atoms, a cyclohexyl group, phenyl group, tolyl group, naphthyl group, benzyl group, phenylethyl group, chloromethyl group or trifluoropropyl group.

16. The method of claim 8, wherein the silicon-containing compound is a monomeric compound of one of the following formulae:

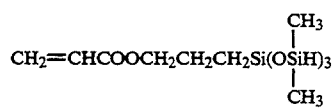

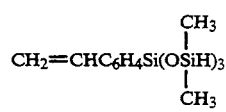

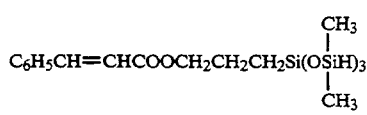

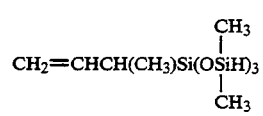

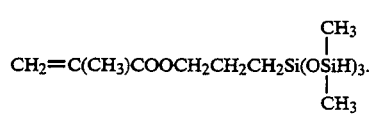

17. The method of claim 14, wherein the silicon-containing compound is a monomeric compound of one of the following formulae:

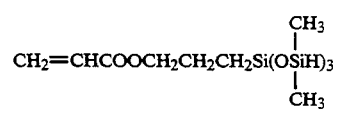

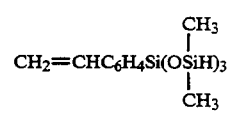

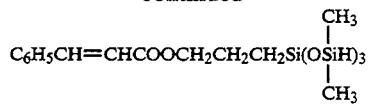

18. A method for preparing an integrated thermoplastic resin/silicone rubber article comprising modifying a thermoplastic resin with a silicon-containing compound having at least one hydrogen atom directly attached to a silicon atom, as an —SiR₂H or —SiRH₂ group, and an aliphatic unsaturated group in a monomeric or polymeric molecule where R is a monovalent hydrocarbon group having 1 to 10 carbon atoms, optionally substituted by halogen atoms, by mixing and heating them.

molding the thermoplastic resin into a shape, contacting an uncured silicon rubber with the molded thermoplastic resin, and curing the silicone rubber to the thermoplastic resin at a temperature below the softening point of the thermoplastic resin, wherein the silicon-containing compound is a monomeric compound of one of the following formulae:

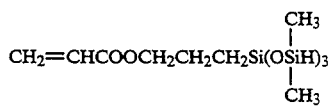

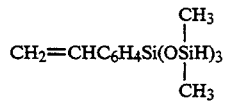

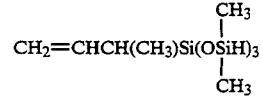

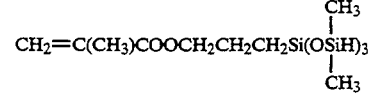

a polymer of these compounds, a copolymer of two or more of these compounds or a copolymer of one of more of these compounds with other polymerizable monomers selected from the group consisting of alkyl acrylates, styrene, maleic anhydride, vinyl ether, vinyl acetate and vinyl silane.

* * * * *